United States Patent [19]
Hansen et al.

[11] Patent Number: 5,887,093
[45] Date of Patent: Mar. 23, 1999

[54] OPTICAL FIBER DISPERSION COMPENSATION

[75] Inventors: Per Bang Hansen, Bradley Beach; Gloria Regina Jacobovitz-Veselka, Morganville, both of N.J.

[73] Assignee: Lucent Technologies Incorporated, Murray Hill, N.J.

[21] Appl. No.: 928,580

[22] Filed: Sep. 12, 1997

[51] Int. Cl.$^6$ .............................. G02B 6/26; G02B 6/02; H04B 10/00
[52] U.S. Cl. ........................ 385/27; 385/123; 359/160; 359/161; 359/173; 359/341; 372/6
[58] Field of Search ............................. 385/27, 123, 124; 372/6; 359/341, 124, 160, 161, 173

[56] References Cited

U.S. PATENT DOCUMENTS

| | | | |
|---|---|---|---|
| 5,361,319 | 11/1994 | Antos et al. | 385/123 |
| 5,696,614 | 12/1997 | Ishikawa et al. | 359/124 |
| 5,719,696 | 2/1998 | Chraplyvy et al. | 359/341 |
| 5,742,723 | 4/1998 | Onishi et al. | 385/124 |

*Primary Examiner*—Hemang Sanghavi
*Attorney, Agent, or Firm*—George S. Indig

[57] ABSTRACT

A module, for upgrading optical fiber systems, includes an appropriate length of Dispersion Compensating Fiber (DCF) for nulling chromatic dispersion, together with a pump, which uses Stimulated Raman Scattering for amplifying signal in the DCF, thereby compensating for power loss associated with the DCF.

16 Claims, 5 Drawing Sheets

OPTICAL FIBER DISPERSION COMPENSATION

TECHNICAL FIELD

Optical fiber systems using dispersive transmission fiber and Dispersion Compensation Fiber (DCF).

DESCRIPTION OF RELATED ART

State-of-the-art optical fiber systems provide for high density, long distance communication which was unimaginable a few years ago. Such systems use finite-dispersion fiber, e.g., TrueWave® fiber manufactured by Lucent Technologies Incorporated, with its low, prescribed dispersion, assuring both high per-channel bit rates and low four-photon mixing for expedient multi-channel (WDM) operation. Operating systems have four or more Wavelength Division Multiplex channels, each capable of operation at a pulse rate of 2.5 Gbit/sec or greater. Systems soon to be installed use WDM sets of eight channels with a per-channel bit rate of 10 Gbit/sec.

Such systems operate at a system wavelength of 1550 nm. Individual electronic optical-to-electrical signal "regenerators", each together with a transmitter or receiver or with a paired regenerator, defines a "repeater span" of fiber, in turn, made up of "amplifier spans" perhaps 100 kilometers in length, each with an optical amplifier at one or both ends of the span.

The prevalent optical amplifier is the "Erbium-Doped Fiber Amplifier" (EDFA). Its development fulfilled a need of many years standing—of many years of dissatisfaction with regenerators. The story of its choice and development is chronicled in "High-Gain Rare-Earth-Doped Fiber Amplifier Operating at 1.54 $\mu$m", R. J. Mears, OFC '87, Washington, D.C., 1987, Proc. Vol. 3, pg. 167. One reason for choice of 1550 nm operation, in preference to earlier usual operation at 1310 nm system wavelength, is unavailability of an analogous doped fiber amplifier for use at the shorter wavelength (see "Dispersion-Compensating Fiber for Upgrading Existing 1310-nm-Optimized Systems to 1550-nm Operation", A. J. Antos et al., OFC/IOOC '93, Technical Digest, pp. 204–205).

Raman amplification, for some years, thought the approach of choice, was totally displaced with introduction of the EDFA. The Raman interaction, see *Non Linear Fiber Optics*, G. P. Agrawal, Academic Press, Inc., 1989, pp. 218–225 shares the EDFA passband capability for simultaneous amplification of member channels of the WDM set, but is viewed as relatively unsatisfactory due to inefficiency of energy transfer from pump to signal. Due to unavailability of an amplifier equivalent to the EDFA for use at 1310 nm operation, it continues to be pursued for possible use in systems using that signal wavelength (e.g., for dual wavelength systems simultaneously operating with WDM channel sets both at 1310 nm and 1550 nm).

New high-capacity systems focus attention on inadequacies of earlier-installed single-channel systems and on methods and apparatus for upgrading. Relevant existing systems operate at a system wavelength of 1310 nm. Fiber used is "unshifted", of low chromatic dispersion at that wavelength, but with significant dispersion when used at 1550 nm—e.g., a value of ~16 ps/nm-km—in most instances sufficient to preclude state-of-the-art per-channel bit rates, e.g., of 10 Gbit/sec in single channel, as well as multiple channel operation.

Newly-installed systems, designed for operation at 1550 nm, have, for some time, used transmission fiber designed to minimize the dispersion-limitation on capacity. Dispersion-shifted fiber (DSF) with a dispersion null at 1550 nm has, more recently, been replaced by finite dispersion fiber such as TrueWave®, providing a small prescribed amount of dispersion to offset the non-linear 4-photon mixing limitation in WDM operation, see U. S. Pat. No. 5,327,516, issued Jul. 5, 1994. In both instances, reduced dispersion makes use of "waveguide dispersion" for compensating for material dispersion. (Reduced mode field size introduces dispersion of negative sign for compensating the usual positive dispersion of silica-based glass in the wavelength range of concern.) There are, however, circumstances under which the small increase in insertion loss resulting from reduced mode field size is a concern. A prime example is in underwater systems in which maximum amplifier spacing is an overriding economic consideration. It is likely that such systems—even as designed for WDM operation—will continue to use dispersive fiber for transmission. New underwater systems are likely to use "pure" (i.e., undoped) silica core transmission fiber ("PSCF") avoiding the small (~10%) increase in loss attributable to index-increasing dopant, but slightly increasing 1550 nm dispersion still further to ~19 ps/nm-km.

It has been appreciated for some time that the bit-rate limiting effect of chromatic dispersion, a linear effect, could be compensated by series connection with fiber of opposite sign of dispersion, see "All Optical Fiber-Based 1550 nm Dispersion Compensating in a 10 Gbit/s, 150 km Transmission Experiment Over 1310 nm Optimized Fiber", J. M. Dugan, et al., OFC '92, 1992, post deadline paper, PD-14, pp. 367–368. Effort directed to a suitable Dispersion Compensation Fiber (DCF) has culminated in a fiber of the needed negative sign of dispersion, and a dispersion of magnitude several (e.g., 4–5) times greater than that of usual in-ground fiber, all as measured at 1550 nm, so that compensation is accomplished with a coil of DCF of length smaller than that of the span being compensated. It has a dispersion slope of opposite sign as well for precise compensation. See Lucent Technologies Inc., Specialty Fiber Devices specification sheet, "Dispersion Compensating Fiber" (DK-SM).

DCF, like all fiber, has an insertion loss which must be taken into account in system design. An aggravating consideration—as in DSF, compensation depends on "waveguide dispersion"—which requires reduction in core size and further increases insertion loss. By all accounts, installation will require further amplification to offset loss in the DCF. See OFC '92, Dugan et al. paper cited above, describing a module provided with an EDFA for this purpose.

SUMMARY OF THE INVENTION

A module compensating for chromatic dispersion of dispersive transmission fiber, for operation at a system wavelength of 1550 nm, includes DCF together with amplifying means for offsetting insertion loss of the DCF. Rather than using an EDFA, the new module uses a Raman pump source, with considerable saving in equipment cost. Feasibility is attributed to the small mode field diameter of the DCF, attendant on the significant waveguide dispersion contribution required to develop the needed dispersion of large magnitude and negative-sign. As compared with usual transmission fiber, in which mode field diameter is maximized, Raman pumping is ~3 times as efficient, so that required pump powers are readily obtained from semiconductor laser diodes of commercial design. Properties which led to general adoption of the EDFA for use in 1550 nm systems are retained. For WDM, the Raman passband is of sufficient breadth for simultaneous amplification of member channels—relatively uniform amplification across the band may offer some advantage over an EDFA with uncompensated gain spectrum.

Expected initial use will be for upgrading of 1310 nm systems for operation at 1550 nm and this is a preferred embodiment. Systems depending on undoped silica core fiber for transmission are examples of new installations making use of the claimed module. In either event, the DCF is a compact element—likely in spool form—located in a terminal housing. In all instances, the module provides for operation at a system wavelength of 1550 nm, with capability for WDM operation, either initially, or for future upgrading.

The claimed "loss-free module" may include elements in addition to the DCF and Raman pump. One such element is an isolator provided at the module input for avoiding reflections and unwanted resonances as well as emission of pump energy by the module. Another is a wavelength selective coupler for routing pump and signal energy. It is expected that commercial product will include one or more modules each of total dispersion sufficient for compensation of a fraction or the entirety of single span of transmission fiber of commonly encountered length. It is anticipated that larger systems, constituted of more than a single span, will be accommodated by use of multiple modules, generally in series connection. Multiple module locations are visualized—one or more might be located at transmitter, receiver, and repeater terminals.

Terminology

Description is expedited by the following definitions. Violence is not done to common usage—the purpose being to indicate intended specific meanings without need for repetition.

Dispersion

When used without a modifier, the term means "chromatic dispersion", the linear, power-independent dependence of light velocity on wavelength. Unless otherwise specified, indicated values are measured at a wavelength of 1550 nm. If only magnitudes are given, the signs of the dispersion are negative (−) for the DCF⁻ and positive (+) for transmission fiber. Comparatives ignore sign and refer to absolute values.

Dispersion Compensating Fiber or DCF

Fiber of negative sign of dispersion and of magnitude of dispersion of at least −50 ps/nm-km, intended for compensation of positive dispersion in "standard fiber".

Standard Fiber

Transmission fiber of positive sign of dispersion, and of dispersion magnitude at 1550 nm in the approximate range of +16 to +20 ps/nm-km. Examples are undoped silica-core fiber, and "unshifted" transmission fiber used in installed single-channel systems designed for operation at a system wavelength of 1310 nm.

System Wavelength

While specific magnitudes, e.g., 1550 nm or 1310 nm, are used for brevity, consistent with general usage, any value within the associated transparency "window" of silica fiber is intended. The prescribed value is necessarily embraced within the wavelength band of any associated WDM channel set. The invention is directed to upgrading to permit WDM operation, generally using EDFA span amplifiers, so that the specific wavelength value intended for "1550 nm operation" must lie within the passband of the EDFA—for present devices in the approximate range of from 1520 nm to 1610 nm (see "Ultra wide band erbium-doped silica fiber amplifier with 80 nm of bandwidth", Y. Sun et al, Topical Meet. on Optical Amp. and Their Appl., Victoria, BC, July 1997).

Bit Rate

Unless otherwise specified, reference is made to per-channel bit rate. Consistent with common usage, numbers are rounded, e.g. with "10 Gb/s" representing the value of 9.963 Gb/s of the OC-192 standard.

WDM

Wavelength Division Multiplexing with closely spaced channels—≦5 nm spacing—to enable 1550 nm system operation with simultaneous amplification of the channel set by an individual EDFA.

Repeater Span

Length of fiber between successive repeaters or between transmitter or receiver and its nearest repeater.

Fiber Span or "Span"

Length of fiber bounded at either or both ends by an optical amplifier.

Loss-free

Descriptive of the inventive module as provided with amplifier capability for offsetting DCF-associated loss to result in a module capable of operating at a loss which is reduced to a value regarded as acceptable. Generally, offsetting loss to result in residual module loss in the range of ±3 dB of perfect cancellation meets the criterion.

DETAILED DESCRIPTION

The inventive requirement is for Raman pump capability for offsetting loss associated with the totality of DCF at a concerned terminal housing—including insertion loss of the DCF itself together with splice and other connection losses. Raman pump capability provided at that housing is discrete, and directed to use of the DCF as the amplifier medium. While it is not intended that this capability be used for pumping transmission fiber, and while isolation preventing this is included in a preferred embodiment, it is not precluded that pump capability exceed DCF-associated loss for any specific application.

Figure 1:
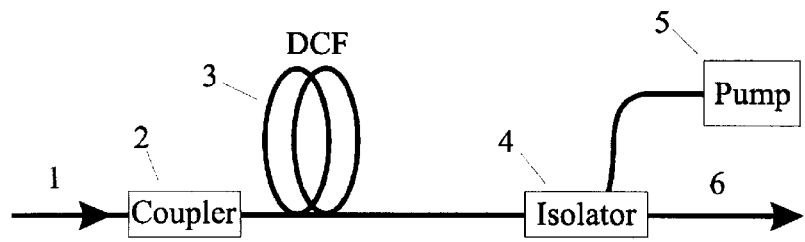
FIG. 1 is a schematic diagram showing a loss-free, dispersion-compensating module of the invention.

Discussion of the module, including characteristics of the various elements, refers to FIG. 1. Shown in an operating system, incoming signal, introduced at input 1, passes in succession through isolator 2, DCF 3, and coupler 4 which serves for superimposition of Raman pump energy generated by pump source 5, resulting in processed signal at output 6.

DCF

The module is designed for local installation, generally in a transmission terminal at the site of a transmitter, receiver or repeater, so that the DCF is in compact form, likely consisting of one or more spools of fiber. Candidate systems contemplated use transmission fiber of positive sign of dispersion ("standard fiber"), so that the DCF has a negative sign of dispersion. A variety of considerations—convenience, spool length, insertion loss, availability—suggest a minimum dispersion, D, of −50 ps/nm-km. A suitable, commercially-available DCF, used in the reported experiment, has a D=−89.2 ps/nm-km.

The length of a DCF spool is conveniently expressed in terms of accumulated dispersion. Span lengths, encompassing installed as well as new systems now contemplated, are likely to be in the range of 30 km–450 km, corresponding with accumulated dispersion values of the order of +500 ps/nm to +9000 ps/nm. For the three (amplifier) spans per repeater span, typical of state-of-the-art systems, the total dispersion required for compensation might be in the range of from −1500 ps/nm to −27000 ps/nm.

A preferred embodiment of the invention contemplates standard modules of a limited array of dispersion values which may be combined as needed. A set of ten standard values should be sufficient for upgrading most installed systems, while at the same time expediting manufacture and supply. To some extent, specific values will be determined by the market place —in the instance of new systems, the values may contribute to standardization of span lengths. Illustratively, there might be three or four module lengths corresponding with: −500 ps/nm; −1000 ps/nm; and −3000 ps/nm (equivalent to about 5.6 km, 11.2 km, and 33.6 km of −90 ps/nm-km DCF respectively), with a fourth, if needed for "fine tuning". (In principle, such a fine-tuning module could be of positive sign of dispersion, but it is likely it, too, will depend on waveguide dispersion contribution for achieving a high dispersion value to minimize length, and so be of negative sign.) Availability of a fine-tuning module of −100 ps/nm, used by itself or in combination with one or more additional such modules, would enable compensation to within ±50 ps/nm of a desired value. A −40 ps/nm dispersion fine tuning module would enable a net (compensated) dispersion of ±20 ps/nm, a degree of precision considered adequate for today's most demanding use. It is likely that a module of so low a dispersion would be a passive unit, without provision for an independent pump.

A commercial offering consists of three passive modules of standard values: 680 ps/nm, 850 ps/nm, and 1020 ps/nm. Equipped with Raman pump/s, such a set might find acceptance.

Precise specification of DCF design for the purpose of the invention is complicated. The invention depends on small mode field diameter, which in turn, depends on an array of considerations including fiber profile and core-to-clad variation in refractive index (Δn). Paradoxically, fiber design, in one important aspect, reflects effort to maximize mode field size, e.g., to lessen bending loss and to minimize non-linear effects (and the commercial DCF used in the experiment reflects effort to maximize mode field size commensurate with needed large negative dispersion). Specification of a unit dispersion value of ≧−50 ps/nm-km for the DCF requires a waveguide dispersion contribution sufficient, in accordance with present design practice, to assure a small mode field diameter, assuring the Raman efficiency underlying the invention. It is conceivable that the inventive objective may prevail over more orthodox considerations to result in fiber designs for lessening mode field diameter. A mode field diameter ≦7 μm is desired for the DCF of the claimed module.

Pump Source

A theme of the invention—suitability of relatively low-power pump sources for the loss-free module—in one embodiment, translates into incorporation of a single-stripe semiconductor laser diode of conventional design. Already commercially-available for use at other wavelengths, design change to accommodate the new need follows accepted principles. A single such diode, with its available power of 130–180 mW or greater, suffices for smaller modules, and, used in tandem with one or more additional diodes, is suitable for greater lengths of DCF. (Based on measured results, a power of 350 mW is needed for a −3000 ps/nm module.) An illustrative form of tandem operation makes use of a polarization coupler for combining lasers of orthogonal polarized emissions. Another makes use of a wavelength-selective coupler for combining lasers of different wavelength emissions.

Advances in LED design may result in substitution of an incoherent device for the laser diode. Of greater significance is the recently announced cascaded Raman resonator, pumped by a diode-pumped, dual-clad, fiber laser (Dig of Topical Meeting on Optical Amplifiers and Their Applications, Paper SaA4, S. G. Grubb et al, 1995). Capable of an ideally-positioned 1453 nm center wavelength and with its power level ≧1.6 W, it is suitable for pumping the assemblage of DCF elements for compensating the largest repeater span. As production costs lessen, the cascaded device may supplant the conventional single stripe laser, at least in larger systems.

It is the expectation that, at least for the near future, suitable Raman sources will be coherent in output, and that they will depend on one or more semiconductor lasers for operation.

A pump source may serve more than a single DCF spool. Adhering to the concept of the loss-free module—one containing both DCF and pump—it is convenient to view a module as constituted of a pump together with one or more DCF spools or "DCF units". Likely in series connection, such units may have the same or different dispersion values, e.g. corresponding with the proposed "standard modules". Similarly, the pump source may be constituted of two or more diodes, in any event with output leads for parallel or series pumping of units as desired.

Coupler

This element serves to couple the pump with the DCF. One suitable design, providing for different pump and signal routing on the basis of difference in wavelength—on the necessarily shorter pump wavelength—is known as a wavelength selective coupler (WSC). Since functioning in the manner of a WDM multiplexing coupler it is known to some as a "WDM"). A circulator is an example of a coupler which ignores wavelength difference, in combining pump and signal while maintaining route separation, based on difference in direction of propagation.

A preferred module design positions the coupler on the module output, providing for pumping the DCF in the direction counter to the signal direction. Such "counter-directional pumping" minimizes noise transfer from the pump to the signal, as described in Application SN 08/683044 filed Jul. 15, 1996.

Isolator

This optional element is included in a preferred embodiment to minimize back reflection —importantly of signal— at the module input, which, can result in resonances and accompanying decrease in signal-to-loss ratio. Commercially available isolators, with isolation values ≧40 dB for contemplated operating parameters, are adequate.

System Operation

Figure 2:
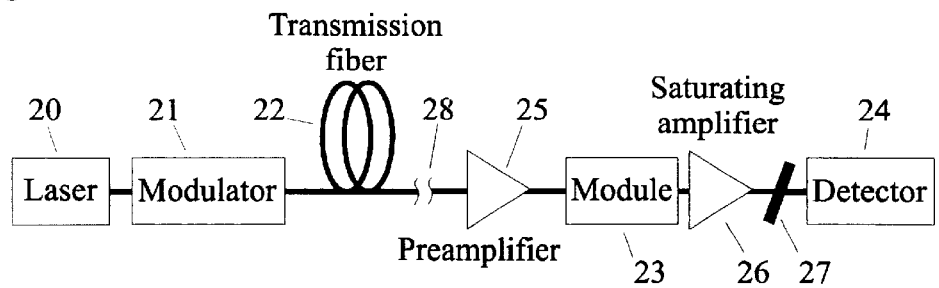
FIG. 2 is a schematic diagram of an optical fiber system incorporating a module of the invention.
Figure 3:
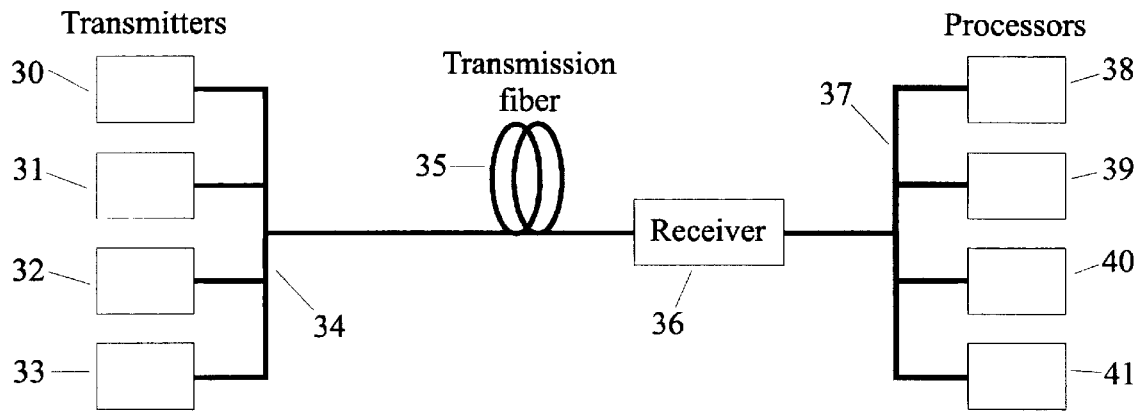
FIG. 3 is a schematic diagram of an optical fiber system providing for WDM operation.

Discussion of a representative system using a "loss-free module" is aided by reference to FIGS. 2 and 3. The system of FIG. 2 consists of: a laser diode 20 for emission at a system wavelength of 1550 nm, together with a modulator 21 for imposing signal information; transmission fiber 22; a DCF module 23 such as that of FIG. 1; and detector 24. Optional elements shown include: preamplifier 25; saturating amplifier 26; and bandpass filter 27. While the single amplifier span shown suffices for description, a typical operating system is likely to include additional span/s, line break 28 is indicated for this reason.

FIG. 3 depicts such a system, specifically providing for WDM operation. As shown, it consists of four transmitters 30,31, 32 and 33 combined by a passive coupler 34. The combined signal is introduced into transmission fiber 35. The multiplexed signal is received at receiver 36, and is separated into separate channels by demultiplexer 37. As depicted, the system provides for individual channel processors 38, 39, 40 and 41. Individual transmitters may be regarded each as consisting of a laser source and an external modulator such as elements 20, 21, respectively, of FIG. 2. Receiver 36, includes a module such as that of FIG. 1 and, additionally, may contain amplifiers, serving the functions of elements 25 and 26 of FIG. 2. Processors 38–41 may comprise regenerators in the event the span shown is to be followed by an additional regenerator span.

EXAMPLES

The Module

Figure 4:
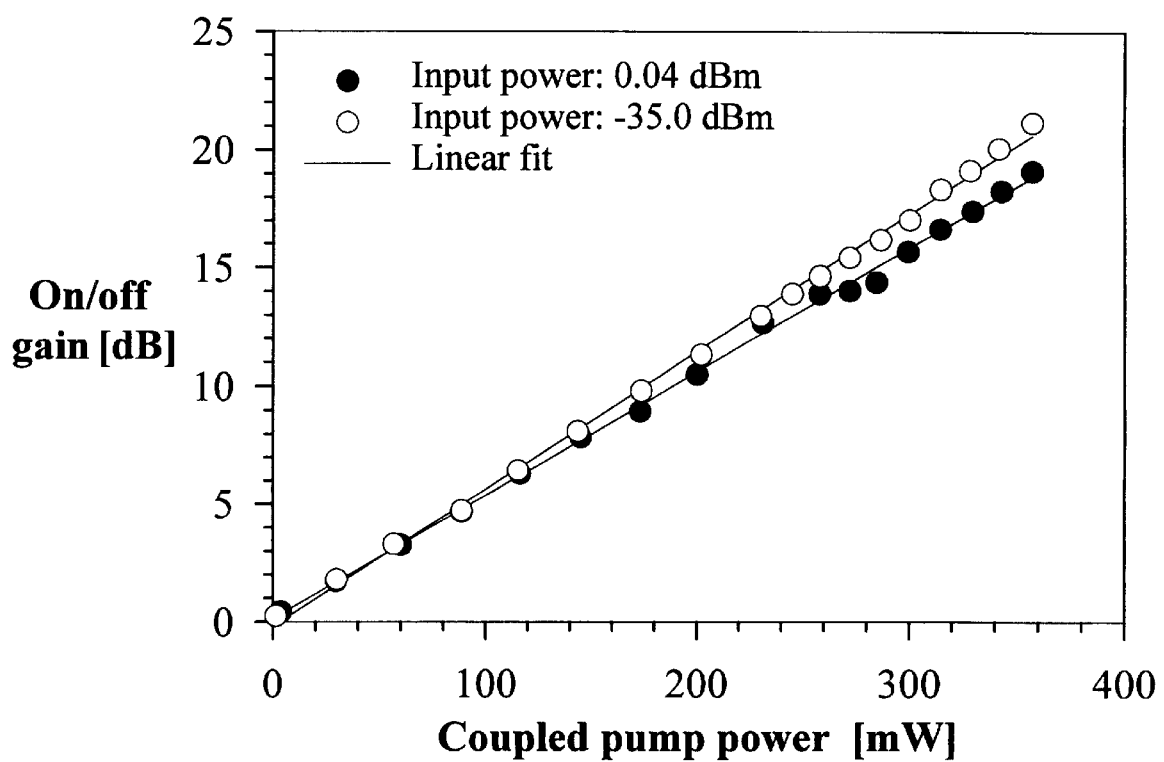
FIG. 4, on coordinates of gain in dB on the ordinate and pump power in mW on the abscissa, relates Raman gain resulting in the DCF to required pump power, for two signal powers as measured at the input to the module.

FIG. 4 reports measurements using the illustrative DCF of the Table. The DCF module, shown in FIG. 1, provided 1400 ps/nm dispersion at a system wavelength of 1554.3 nm. The pump was a diode laser with a center wavelength of 1453 nm. Input and output coupling losses were 0.94 dB and 0.97 dB, respectively. Insertion losses totaled 10.47 dB, including DCF splice losses of 0.42 dB and 0.45 dB. Measured characteristics of the DCF are summarized in the Table.

TABLE

DCF Characteristics

| Description | Symbol | Value |
| --- | --- | --- |
| Raman efficiency | $C_R$ | $2.2 \cdot 10^{-3}$ m$^{-1}$W$^{-1}$ |
| Loss (1453 nm) | $\alpha_p$ | 0.735 dB/km |
| Loss (1554.3 nm) | $\alpha_s$ | 0.545 dB/km |
| Rayleigh scattering | R | −29.4 dB |
| Mode-field diameter | MFD | 4.87 μm |
| Dispersion | D | −89.2 ps/nm-km |
| Length | L | 15.7 km |

Coordinates of FIG. 4 are: gain in dB on the ordinate; and pump power coupled into the DCF in mW on the abscissa. Measurements are presented for an input power of 0.04 dBm and for a small signal power of −35.0 Bm. Results differed only slightly, showing insignificance of saturation effects of the Raman gain when operated with zero dBm signal input power. At a pump power of 225 mW, chosen as the operating point, the net gain was 1.4 dB. Coupled pump power required, to offset the 8.56 dB loss of the DCF itself, was 160 mW. From FIG. 4, it is seen that significant net (excess) gain results from further increasing pump power. As discussed, it is not the objective to significantly exceed loss associated with the DCF—in any event, double Rayleigh scattering will eventually impact noise performance. Data reported on FIG. 4 shows suitability of a single-stripe laser diode pump.

Figure 5:
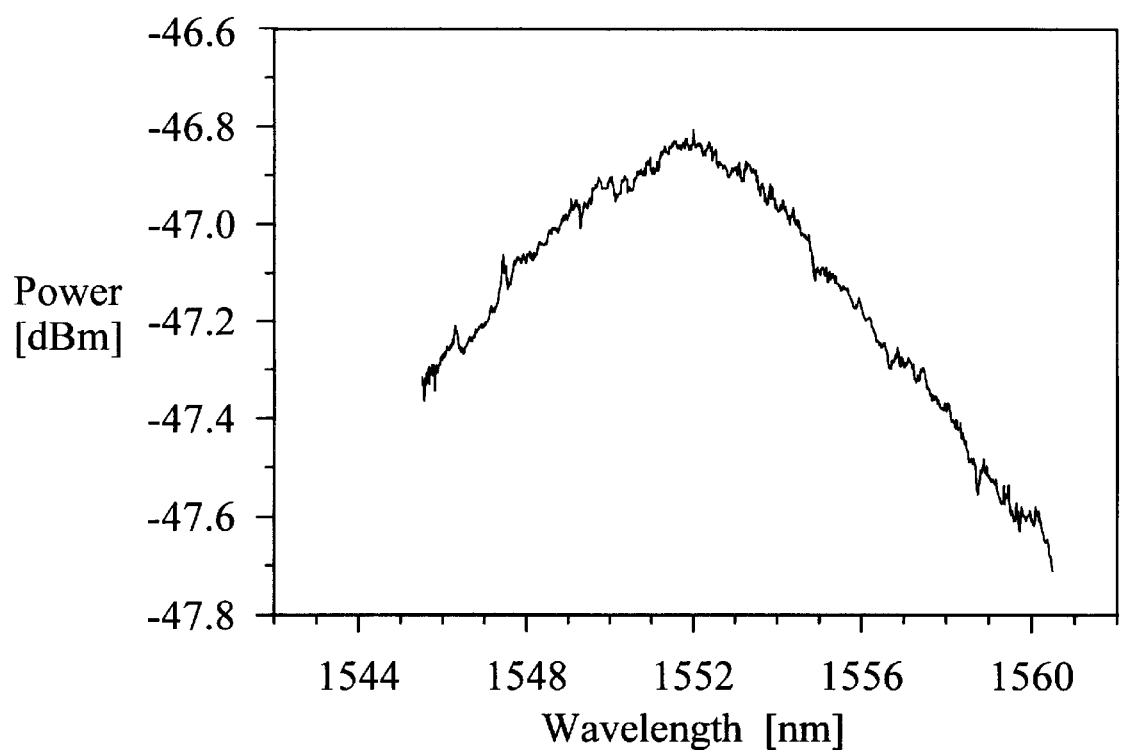
FIG. 5, on coordinates of power in dBm and wavelength in nm, is a plot showing the measured spectrum of amplified spontaneous emission (ASE) noise at the output of a loss-free module.

FIG. 5, on coordinates of power in dBm and wavelength in nm, is a measure of the amplified spontaneous emission (ASE) noise at the output of the DCF module for coupled pump power of 225 mW. The measurement bandwidth was 0.2 nm. At the signal wavelength of 1554.3 nm, the ASE level was −47.0 dBm.

Example

System

The performance of the module was investigated in the transmission experiment schematically shown in FIG. 2. The transmission fiber was a 71 km span of (undoped) silica-core fiber with insertion loss of 13.2 dB and total dispersion of 1380 ps/nm. The transmitter consisted of an externally modulated DFB laser (laser 20 together with Mach-Zender modulator) operating at 1557.4 nm with a pseudo-random end-coated optical bit stream with a word length of $2^{31}-1$ at a data rate 10 Gb/s. The receiver included a three-section optical preamplifier, a tracking Fabry-Perot filter 27, a PIN detector 24 together with microwave amplifier and clock recovery circuitry. Preamplification resulted from a conventional two-stage amplifier 25 and a saturating amplifier 26. The DCF module was between the two amplifiers. With a received signal of −35.8 dBm, the input power to module 23 was −1.4 dBm (−2.3 dBm into the DCF). Resulting net dispersion was −20 ps/nm.

Figure 6:
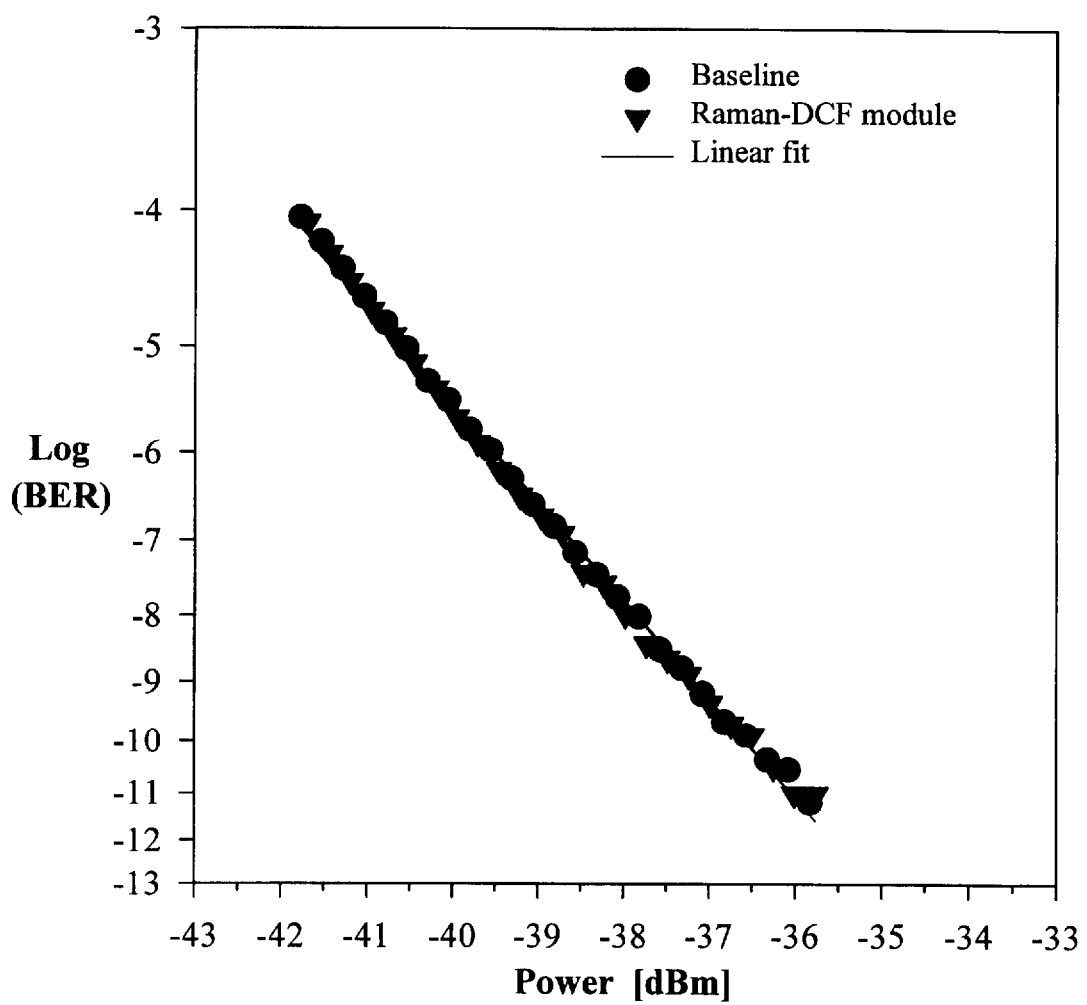
FIG. 6, on coordinates of log(BER) and power in dBm, is a plot showing the relationship between bit error rate and input power at the receiver for two cases—one with and one without a dispersive fiber span and associated loss-free module.

FIG. 6 is a plot of bit error rate (BER) against received power, with plotted data showing penalty-free operation with a claimed module. A first set of data points (shown as triangles) is for the dispersive 71 km transmission fiber span together with a loss-free module under conditions reported in the system example. A second set (shown as circles) is for back-to-back performance without span and module. Both sets fall on the same plotted line.

Figure 7A:
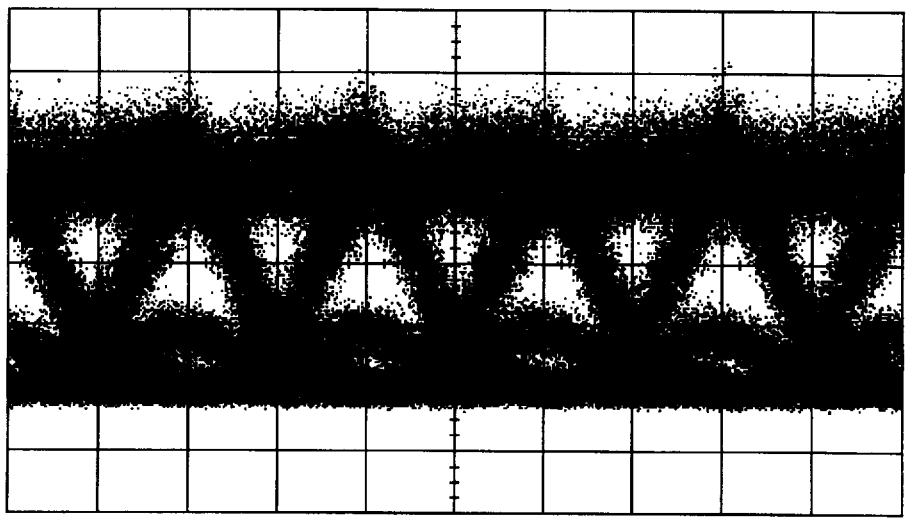
FIGS. 7A and 7B, in ordinate units of power and abscissa units of time, are eye diagrams showing the contrast between ones and zeros in a digital bit stream as measured at the output end of a dispersive fiber span, without and with module-compensation respectively.
Figure 7B:
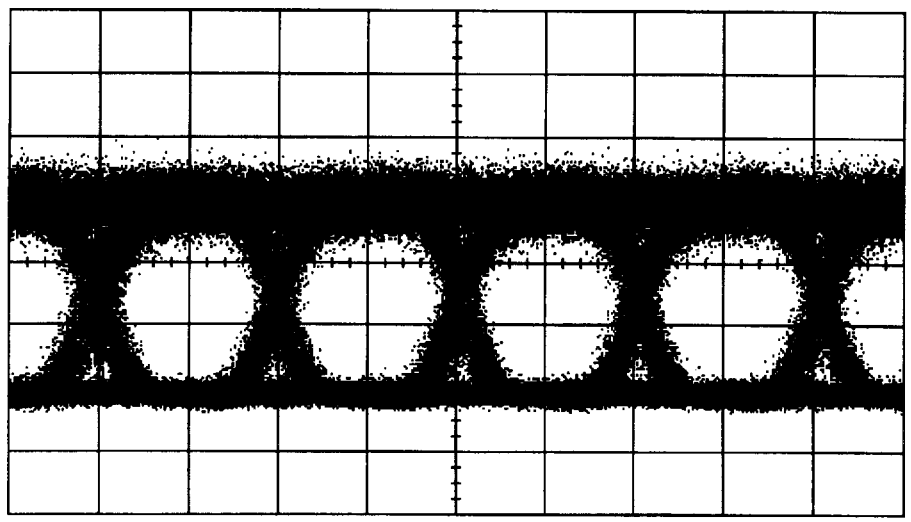

Results are confirmed by the eye diagrams of FIGS. 7A and 7B, both showing measurement of a bit stream at the output of the dispersive 71 km fiber span—FIG. 7B with the module, FIG. 7A without the module, both otherwise under conditions of the system example. Familiar to the system designer, the large eye opening of FIG. 7B shows clear discrimination between ones and zeros, accompanying satisfactory dispersion compensation.

Module

The claimed module is "loss-free", i.e., invariably includes an amplifier which compensates for loss associated with DCF of the module. While a factory package containing both amplifier and DCF is visualized, the commercially-available product may provide for the option of multiple elements—more than a single amplifier, and also more than a single DCF unit. Selection of values for the DCF units will be consistent with discussion pertaining to module dispersion values (since a multiple-unit module is functionally equivalent to a multiplicity of single-unit modules). Manufacturing cost/expediency may dictate a package having amplification capability exceeding the need of its total DCF content—e.g. sufficient to compensate for total loss of that package together with that of one or more passive DCF units.

The claimed module is not necessarily factory-packaged. It may be assembled from separate parts, the requirement being provision for dedicated Raman amplification for compensating for DCF-associated loss.

We claim:

1. Loss-free module for operating at a system wavelength of 1550 nm for compensating for chromatic dispersion of a transmission line of optical fiber, the module including a) input coupling means for coupling signal, b) dispersion compensating fiber (DCF), the DCF consisting essentially of at least one DCF unit of fiber of negative sign of dispersion and of absolute magnitude of dispersion of at least 50 ps/nm-km, c) amplifier means for offsetting loss associated with the DCF, and d) coupling means for coupling the amplifier means to the DCF CHARACTERIZED IN THAT the amplifier means includes at least one pump for emitting pump energy at a wavelength shorter than that of the system wavelength, whereby signal in the DCF is amplified by stimulated Raman scattering.

2. Module of claim 1 in which the pump is a semiconductor diode.

3. Module of claim 1 in which the DCF consists essentially of at least two series-connected DCF units.

4. Module of claim 1 in which a DCF unit consists of a spool of DCF of a total dispersion selected from the group consisting of a series of a maximum of 10 members.

5. Module of claim 4 in which the maximum dispersion of a member is −3000 ps/nm.

6. Module of claim 4 including a tuning DCF spool for fine-tuning dispersion, the dispersion of the tuning DCF spool being of either positive or negative sign of dispersion and having an absolute value of dispersion of twice the desired precision.

7. Module of claim 6 in which the absolute value of dispersion of the tuning DCF spool is ±100 ps/nm.

8. Module of claim 1 in which coupling means is a wavelength selective coupler attached at the output of the DCF, providing for counter-directional pumping.

9. Module of claim 1 in which the pump is a coherent energy source.

10. Module of claim 9 in which the pump is a single-stripe semiconductor laser.

11. Module of claim 9 in which the pump is a cascaded Raman resonator, pumped by a diode-pumped dual-clad fiber laser.

12. Module of claim 1 in which the input means includes an isolator.

13. Optical fiber communication system for operating at a system wavelength of 1550 nm, comprising a transmitter, at least one span of transmission fiber provided with input and output signal coupling means, the transmission fiber evidencing chromatic dispersion at the system wavelength, and a receiver, said system provided with compensating means for compensating for chromatic dispersion of the transmission line, such compensating means including a) dispersion compensating fiber (DCF), the DCF consisting essentially of at least one DCF unit of fiber of negative sign of dispersion and of absolute magnitude of dispersion of at least 50 ps/nm-km, b) amplifier means for offsetting loss associated with the DCF, and c) amplifier coupling means for coupling the amplifier means to the DCF, CHARACTERIZED IN THAT the amplifier means includes at least one pump for emitting pump energy at a wavelength shorter than that of the system wavelength, whereby signal in the DCF is amplified by stimulated Raman scattering.

14. System of claim 13 in which the module is connected with the output signal coupling means of the transmission fiber.

15. System of claim 14 including at least two spans of transmitter fiber, one of which is provided both with a said module and with a repeater.

16. System of claim 13 for WDM operation, the transmitter including multiplexing means for multiplexing channels of a WDM set, and the receiver including demultiplexing means for demultiplexing such channels.

* * * * *